Patented May 6, 1952

2,595,956

UNITED STATES PATENT OFFICE 2,595,956

POLYVINYL ACETATE EMULSION CONTAINING AN ALKOXY ACETATE, AND BASE COATED THEREWITH

Walter G. Kunze and Raymond Bertram Evans, Catonsville, Md., assignors to Le Page's Inc., Gloucester, Mass., a corporation of Massachusetts No Drawing. Application April 6, 1950, Serial No. 154,428

6 Claims. (Cl. 260—29.6)

This invention relates to emulsions of polymers which are suitable for use as coatings and as adhesives. It is particularly concerned with an emulsion of polymers which is capable of providing a water-resistant bond or coating, and which at the same time retains the stability, fluidity and the various other physical properties of such an emulsion which make it particularly useful as a coating or adhesive.

The use of melts and solutions of water-insoluble artificial resins in the coating and adhesive art has been supplanted to a large extent by emulsions of such resins, particularly polyvinyl acetate emulsions, due to the improved ease, economy and safety with which aqueous emulsions of the resins may be employed. On the other hand, the usefulness of water-insoluble polymer emulsions has been limited by the characteristic lack of water-resistance of the coatings and bonds deposited therefrom at room temperature and the tendency of such coatings and bonds to re-emulsify or disintegrate when subsequently brought into contact with water during the course of normal use of the object or article to which they have been applied.

This lack of water-resistance has been considered innate in the coatings and films deposited from such polymer emulsions inasmuch as water-soluble emulsifying and bodying agents are employed necessarily to establish and stabilize the emulsion. These agents are apparently carried into the film or bond deposited from the emulsion upon application of the emulsion to a surface, and actively exhibit the emulsifying effect on the polymer comprising the body of the coating or film and cause its redispersion when the surface is brought into contact with water.

Various proposals have been made to obviate the water-sensitivity of the coatings or bonds deposited from such emulsions, but in general these proposals have been directed to modifying emulsions of such polymers which have been prepared in a specific manner, or require treating the emulsion with certain diluents immediately prior to its application due to the recognized tendency of the suggested diluents to either break or gel the emulsion shortly after the addition of the diluent.

Prior to the instant invention, for example, a common expedient for increasing the water-resistance of a coating or film deposited from a water-insoluble polymer emulsion included the addition of a quantity of one or more substances such as dimethylol urea, trimethylol melamine, certain chromium salts, strong acids or highly reactive aldehydes such as glyoxal, certain resins, toluene and peroxides. In most instances it was required that the substances be added to the polymer emulsion immediately prior to use as the resulting compositions were unstable and certain of the substances resulted in a progressive increase in the viscosity of the emulsion until a gel was formed. Gelling rendered the composition unfit for use in adhesive applicator machines operated at high speed. Additionally, the modification effected by some of these substances did not result in a substantial improvement in the water-resistance of the coating or film deposited from the emulsion, and often imparted undesirable color and foaming characteristics to the emulsion.

Where thermo-plastic polymeric material has been employed it has been suggested that the water-resistance of the coating or bond deposited from an emulsion of the material can be improved by heating the coating or bond sufficiently to cause coalescence of the material into a homogeneous mass. This procedure is obviously not suitable where the emulsion is employed as a quick-setting adhesive in high-speed mechanical applicators, and in any event the drying and heating suggested often makes the use of such emulsions impractical.

A further suggestion directed to retaining the advantages of working with the polymers in an aqueous medium and at the same time avoiding the inherent disadvantages of water-sensitivity of the coatings or films deposited therefrom required dispersing the polymer as extremely small particles. The coatings or films deposited from such emulsions do exhibit a satisfactory water-resistance, but due to the fine particle size which imparts the water-resistance, the emulsions do not have the tack necessary to make them useful as quick-setting adhesives.

It is an object of this invention to provide a composition comprising an aqueous emulsion of a polymer, particularly a polymer of vinyl acetate, alone or in combination with small amounts of other monomers, which is stable throughout long periods of storage and which when employed as a coating or as an adhesive will deposit a coating or bond which is water-resistant. A further object of the invention is to provide a process which is generally applicable to modify emulsions of polymers, particularly polyvinyl acetate, which have been polymerized to different extents, or in different manners, and which include various combinations of plasticizers and other diluents commonly employed to develop favored characteristics in the films or coatings deposited from such emulsions.

We have discovered that water-resistance of coatings or bonds deposited from an aqueous emulsion of polymers, particularly polyvinyl acetate emulsions, which are formulated, or modified, to have a tackiness rendering them suitable for use as quick-setting adhesives, can be established by additions of one or more of a certain group of organic compounds within specific limits. These active compounds are characterized by a particular balance between the parts of the monomeric molecule, one part of which is hydrophilic or polar in nature, and the other part of which is hydrophobic or non-polar. The effectiveness of the compounds in producing water-resistance in the coatings or bonds deposited from such emulsions is apparently due to the presence of both the polar and non-polar groups within the molecule in the prescribed balance.

As a class, these active compounds exhibit solubility, to various extents, in both water and in organic solvents such as mineral spirits, petroleum ether, toluene, castor oil, etc. This solubility in both water and organic solvents apparently is due to the dual hydrophilic-hydrophobic nature of the compound. As it has been generally recognized that the presence of water-soluble emulsifiers carried into the bonds and coatings deposited from emulsions of water-insoluble polymers may later cause redispersion and disintegration of the bonds and coatings, it was particularly surprising to find that incorporating into the emulsion additional compounds which are water-soluble themselves will nullify the effect of the water-soluble emulsifiers and thereby impart water-resistance to the coatings and films deposited from such emulsions.

For present purposes a polar or hydrophilic group or radical may be considered to be one which has a strong affinity for water and which when combined in compounds in which it is the dominant functional group will cause the resulting compound to be immiscible, or miscible to a limited extent, in oil-type solvents. A non-polar or hydrophobic group, on the other hand, may be considered to be one which has slight affinity for water and a strong affinity for oil-type solvents. It has been found that for instant purposes the acetate group exhibits the characteristics desired in polar groups. Certain groups containing carbon, hydrogen and oxygen, particularly ether chains having from 4 to 8 carbon atoms, may be considered as non-polar groups.

It has been found that the esters of acetic acid in which the ester ion is combined with an ether chain having 4 to 8 carbon atoms have the requisite polar-non-polar balance and are effective in imparting water-resistance to the coatings and bonds deposited from a polyvinyl acetate emulsion with which they are incorporated. For example, the acetate ester of ethylene glycol mono ethyl ether in which the 4 carbon mono ether chain effectively balances the polar acetate group is an effective compound. The requisite balance persists in the corresponding butyl ethers of the ethylene glycol acetate. However, when the oxy substitution of the ethylene glycol mono ester results in an ether chain having more than 8 carbon atoms the compound becomes excessively polar in nature and does not act effectively.

The mono esters of acetic acid comprising poly ether chains containing between 4 and 8 carbon atoms, such as the mono methyl, mono ethyl and mono butyl ethers of di-ethylene glycol mono-acetate are also active compounds as the requisite polar-non-polar balance in the molecule does not appear to be disturbed by the presence of more than one ether linkage in the non-polar portion of the molecule of the active compound. Similarly, the presence of carbonyl oxygen in the non-polar portion of the molecule appears to have little effect; thus indicating that the number of carbon atoms present in the hydrophobic portion of the molecule determines the degree of non-polarity exhibited by that portion of the molecule.

The preferred range of quantities of one or more of the active compounds by weight with respect to the solid content of the polyvinyl acetate emulsion has been found to be between about 4 to 25%, the optimum amount in a particular instance depending upon the initial water-resistance characteristics of the starting material emulsion, the amount of plasticizers employed, and the age of the starting material emulsion.

The physical properties of a polyvinyl acetate emulsion such as the viscosity of the emulsion, and the tensile strength, flexibility and heat sealing temperature of the film or bond deposited from the emulsion are determined in a large part by the degree of polymerization of the vinyl acetate monomer. A higher degree of polymerization results in increased bond strength, a higher heat sealing temperature and a somewhat higher initial water-resistance, which is, however, considerably less than required commercially for a water-resistant coating or bond. A lesser quantity of the active compounds is necessary to impart the desired water-resistance to the deposited coatings or bonds when the relatively greater water-resistant emulsions are employed as a starting material.

Polyvinyl acetate starting material emulsions having sufficient tack to be useful as quick-setting adhesives generally contain about 40-65% polyvinyl acetate by weight, and a dried bond produced by the respective emulsions between two sheets of mildly calendered white sulphite paper will disintegrate within 24 hours after immersion in water at room temperature. Such emulsions include the commercially available emulsions known as Elvacet No. 80-900, Elvacet 81-900, Gelva S-50, Polyco 117H, Polyco 117-SS and Polyco 289.

The physical characteristics of the commercially available polyvinyl acetate emulsions identified above may also vary to some extent as a result of the emulsifiers and bodying agents employed in producing the emulsions, and also as a result of particular plasticizers employed. In general, however, the variations which tend to increase the relative initial water-resistance of the starting material emulsions lessen the quantity of the active compounds required to effect complete water-resistance.

The amounts of active compound required to produce maximum water-resistance in a particular emulsion also varies with the quantity and the nature of the plasticizers, extenders, or other diluents which may be used to develop desired characteristics of fluidity or tackiness in the emulsion, or of flexibility, hardness, etc. in the coating or film deposited from the emulsion. In general, it has been found that the insoluble type of plasticizers and resins in common use increase the effectiveness of the active compounds, and that a lesser quantity of active compound is necessary to produce complete water-resistance when such plasticizers are also present in the emulsion. It should be noted, however, that in each instance the emulsion containing the plasticizers and various other diluents was not initially water-resistant and that the addition of the active compound is necessary to effect any satisfactory water-resistance, although as related above, a lesser amount is necessary when insoluble plasticizers are also present.

This enhancing effect of the insoluble plasticizers was particularly observed with respect to dimethyl phthalate, dibutyl phthalate, chlorinated diphenyls, methyl abietate and tributyl phosphate, and appears to be characteristic of other common plasticizers such as di-carbitol phthalate, dibutoxy-glycol phthalate, dimethoxy-glycol phthalate, butyl phthalyl butyl glycolate, methyl phthalyl ethyl glycolate, triglycol di-2-ethylbutyrate, triglycol di-2-ethylhexoate, tricresyl phosphate and triphenyl phosphate.

On the other hand, the presence of certain water-soluble thickeners such as polyvinyl alcohol and sodium carboxymethyl cellulose tend to increase the amount of active compound necessary to effect maximum water-resistance.

In some instances care must be exercised to avoid breaking the emulsion by sudden heating, or by extended heating above the temperature specified. The critical temperature will vary, of course, with the character of the particular starting material emulsion employed.

Aging the composition also tends to increase the water-resistance of the coatings or films deposited therefrom.

It will be apparent from the foregoing that innumerable possibilities for formulating the instant water-resistant composition exist, and that the invention may be practiced to increase the water-resistance of any particular polyvinyl acetate emulsion without materially interfering with the versatility of the starting material emulsion. It will be noted, however, that any of the active compounds having the requisite polar-non-polar balances in the molecules thereof are effective in producing water-resistance when used in quantities within the range of 4–25% by weight of the solids present in the starting material polyvinyl acetate emulsion. The minimum amount of a particular one of the active compounds depends upon the factors discussed above, but in all instances is within the range specified.

Compositions having up to 50% of active compound with respect to the solid content of the starting material emulsion may be employed, especially where the active compound has desirable plasticizing properties and is not too costly.

It will be understood that the films and bonds deposited from emulsions of the type discussed herein have the same composition as the emulsions from which they are deposited except for the water phase of the emulsion which evaporates when the films and bonds dry.

The addition of the active compound to the starting material emulsion may result in a substantial increase in the viscosity of the emulsion to form a cohesive mass unless the active compound is added slowly with continuous agitation. In some instances rapid addition of the active compound results in localized precipitation of the emulsion. The largest part of the increased cohesiveness and viscosity of the emulsion caused by addition of the active compound at a suitable rate disappears on agitation, or when the treated emulsion is permitted to stand for a short period following the addition of the active compound.

In all of the following examples the composition was prepared by stirring the starting material emulsion with a high-speed mixer continuously during the addition of the active compound thereto. The active compound was introduced into the emulsion at the rate of about 3% of the total weight of the active compound per minute.

Each of several tacky starting material polyvinyl emulsions was applied as a coating on the surface of a moderately calendered and sized white sulphite paper and as a bond between two such papers. The films and bonds thus formed were allowed to dry for 24 hours at room temperature and were thereafter immersed in water at room temperature for 24 hours. Upon removal from the water the wet strength of the paper exceeded the bond strength in all cases, and the bond ruptured when the bonded papers were separated. The coatings in each instance had visibly disintegrated. These starting material emulsions were, therefore, considered non-water-resistant, and in the subsequent experiments, satisfactory water-resistance of a film or bond formed from an emulsion treated with an active compound was considered fully indicated when the strength of the bond exceeded the wet strength of the paper after 24 hours immersion.

*Example 1*

A sample was prepared by mixing 6 parts of a dibutyl phthalate plasticizer with 110 parts of a tacky polyvinyl acetate emulsion having about 55% solid content with continuous stirring. Three additional samples were prepared by adding to 110 parts of a tacky polyvinyl acetate emulsion having 55% solid content, respectively, 10, 15 and 20% by weight of the solid content of the emulsion of diethylene glycol monoethyl ether acetate. The ether acetate was added slowly while the emulsion was stirred continuously with a high-speed mixer. Three additional samples were prepared in the same way using the same proportions of starting material emulsion and diethylene glycol monoethyl ether acetate and 6 parts of a dibutyl phthalate plasticizer were added to each of these samples. The films and bonds deposited from all these samples were tested for water-resistance by permitting the films and bonds to dry for 24 hours and thereafter immersing them in water for 24 hours. At the end of this time the films and bonds were examined for evidence of redispersion, continuity and strength. The bonds were formed between two pieces of mildly calendered and sized white sulphite paper. It was found that the films and bonds deposited from the sample consisting of starting material emulsion and plasticizer were not water-resistant. The films had partially redispersed and could be easily rubbed off the paper. The wet strength of the paper exceeded the bond strength so that the bond fractured when the papers were separated. The films and bonds deposited from the samples containing the diethylene glycol monoethyl ether acetate were water-resistant. The films were continuous and intact. The bond strength exceeded the wet strength of the paper so that the bonded surfaces of the paper were torn when the papers were separated.

*Example 2*

Seven samples were prepared in the manner described in Example 1 using the same proportions of starting material emulsion and plasticizer and ether acetate, where used, except that ethylene glycol monoethyl ether acetate and a methyl abietate plasticizer were used in place of the diethylene glycol ethyl ether acetate and phthalate plasticizer, respectively, which were employed in Example 1. The films and bonds deposited from these samples were tested for waterproofness in the manner specified in Example 1. It was again found that the films and bonds deposited from the mixture consisting of starting material emulsion and plasticizer were not water-resistant. The films had visibly disintegrated and were discontinuous. The wet strength of the bonded paper exceeded the strength of the bond, and the bond fractured when the papers were separated. The films and bonds deposited from the samples containing ethylene glycol monoethyl ether acetate were water-resistant. The films were continuous and intact after the period of immersion. The strength of the bonds exceeded the wet strength of the paper so that the surface of the bonded papers was torn when the papers were separated.

It will be apparent that the water-resistant compositions formulated according to the instant invention will considerably extend the usefulness of aqueous emulsions of polyvinyl acetate into the field in which high water-resistance of the bond or coating deposited is necessary, and will find application in bonding or cementing for cellulosic articles such as paper cups or paper bags which in the course of normal use are exposed to water, and for bonding surfaces of cellulosic material to other surfaces of a hydrophilic character such as masonry. These compositions are particularly adapted for use as a sizing where water-resistance of the fabric or the paper to which it is applied is required. It may also be employed in the composition of printing paste, as a finish for paper, paper-board, or foils and in the manufacture of formed or impregnated goods, as well as in distemper paints and the like.

Having thus described the invention, what is claimed as new and desired to be secured by Letters Patent is:

1. A composition comprising an aqueous emulsion of polyvinyl acetate and from 4 to 50% by weight of said acetate of a saturated aliphatic organic compound, each monomeric molecule of the compound consisting of a polar group and a non-polar group, the polar group being an acetate group and the non-polar group consisting of an alkoxy substituted hydrocarbon chain having, including the alkoxy constitutent from 4-8 carbon atoms, the hydrocarbon chain being otherwise unsubstituted.

2. A composition comprising an aqueous emulsion of polyvinyl acetate and from 4 to 50% by weight of said acetate of ethylene glycol mono ethyl ether acetate.

3. A composition comprising an aqueous emulsion of polyvinyl acetate, and from 4 to 50% by weight of said acetate of diethylene glycol mono ethyl ether acetate.

4. A base having a water-resistant coating deposited thereon from an aqueous emulsion of polyvinyl acetate and from 4 to 50% by weight of said acetate of a saturated aliphatic organic compound, each monomeric molecule of the compound consisting of a polar group and a non-polar group, the polar group being an acetate group, and the non-polar group consisting of an alkoxy substituted hydrocarbon chain having, including the alkoxy substituent, from 4-8 carbon atoms, the hydrocarbon chain being otherwise unsubstituted.

5. A base having a water-resistant coating deposited thereon from a composition comprising an aqueous emulsion of polyvinyl acetate and from 4 to 50% by weight of said acetate of ethylene glycol mono ethyl ether acetate.

6. A base having a water-resistant coating deposited thereon from an aqueous emulsion of polyvinyl acetate, and from 4 to 50% by weight of said acetate of diethylene glycol mono ethyl ether acetate.

WALTER G. KUNZE.
R. BERTRAM EVANS.

REFERENCES CITED

The following references are of record in the file of this patent:

UNITED STATES PATENTS

| Number | Name | Date |
| --- | --- | --- |
| 2,444,396 | Collins et al. | June 29, 1948 |

OTHER REFERENCES

"Synthetic Organic Chemicals," published July 1, 1946, by Carbide and Carbon Chemicals, pages 42–43.